June 21, 1966          J. B. RIPPLE          3,256,585

METHOD OF MAKING A ROLLER BEARING CAGE

Filed Sept. 8, 1964          3 Sheets-Sheet 1

INVENTOR.
JOHN B. RIPPLE
BY *Jordon C. Luark*
ATTORNEY

June 21, 1966  J. B. RIPPLE  3,256,585
METHOD OF MAKING A ROLLER BEARING CAGE
Filed Sept. 8, 1964  3 Sheets-Sheet 2

INVENTOR.
JOHN B. RIPPLE
BY
ATTORNEY

June 21, 1966  J. B. RIPPLE  3,256,585
METHOD OF MAKING A ROLLER BEARING CAGE
Filed Sept. 8, 1964  3 Sheets-Sheet 3

INVENTOR.
JOHN B. RIPPLE

ATTORNEY

United States Patent Office 3,256,585
Patented June 21, 1966

3,256,585
METHOD OF MAKING A ROLLER BEARING CAGE
John B. Ripple, 229 Lake Ave. NE., Massillon, Ohio
Filed Sept. 8, 1964, Ser. No. 394,793
3 Claims. (Cl. 29—148.4)

This invention relates to a new method of manufacturing roller bearing cages which are fifteen inches and more in diameter.

A roller bearing cage comprises an outer rim, an inner rim and webs connecting the two. The inner rim is formed with an inner bore flange. The webs divide the space between the two rims into pockets. The shape of these pockets depends upon the shape of the roller bearing—that is, whether it is cylindrical, barrel shaped or tapered.

According to this invention the cage is made from sections of steel, brass, aluminum or other metal, and these sections are arranged on a fixture and then welded together. All of the selections are identical. Each section includes a portion of the inner rim, a portion of the outer rim, and a web which connects the two rim portions intermediate their ends.

The sections are stamped out of heavy sheeting which may be $\frac{1}{16}$ inch thick or thicker. These sections are placed side-by-side on a fixture and then welded together.

The invention will be further described in connection with the accompanying drawings, in which.

Figure 1:
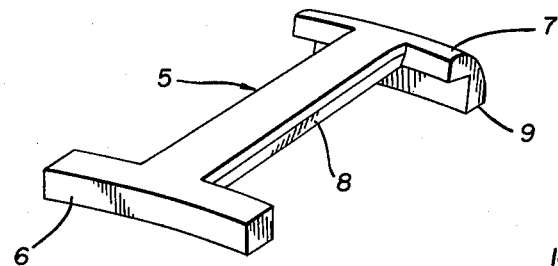
FIGURE 1 is a view in perspective of one section of the cage.

The section 5 of FIGURE 1 includes a portion of the outer rim 6, a portion of the inner rim 7, and one complete web 8. The inner rim includes the inner-bore flange 9. The section of the outer rim in this tapered cage is, of course, somewhat longer than the section of the inner rim because the outer rim is of longer diameter. Any desired number of such sections 5 are welded together along the lines 10 (FIGURE 2) to form the complete cage. A roller 12 is inserted in each of the pockets 13 and the cage, rolls and cone are assembled together. The cone and cup are identified as 15 and 16.

At present, it is common practice to make cages, especially the larger cages, by machining castings or forgings. It is also common practice to make cages by cupping a sheet of metal, stamping out the bottom of the cup, and cutting openings for the rollers. The latter method produces a very high percentage of scrap. Kilian 2,591,160 describes stamping sections from very thin metal, such as 17-gauge steel, and shaping the resulting sections and/or cage as by a flaring operation or stretching. The process of the present invention also utilizes sheet metal, but by punching out the sections and assembling these, the scrap is reduced at least by the amount customarily cut away from the bottom of the cup to form the inner bore of the cage, and the sections are made of such heavy sheet metal that they must be shaped before they are assembled. The pockets are then uniformly spaced on a fixture and united by welding. In assembling the sections, any suitable fixture is employed.

It is not practical to apply this process to small cages such as those having a diameter less than 3 inches and metal thicknesses less than $\frac{1}{16}$ inch. However, it is economical for cages for larger bearings such as cages the smallest diameter of which is about fifteen inches, and larger bearings which may measure thirty-two inches or more in diameter, which are made of steel sheeting at least $\frac{1}{16}$ inch thick, and the sheeting may be as thick as $\frac{5}{16}$ inch or more.

Figure 2:
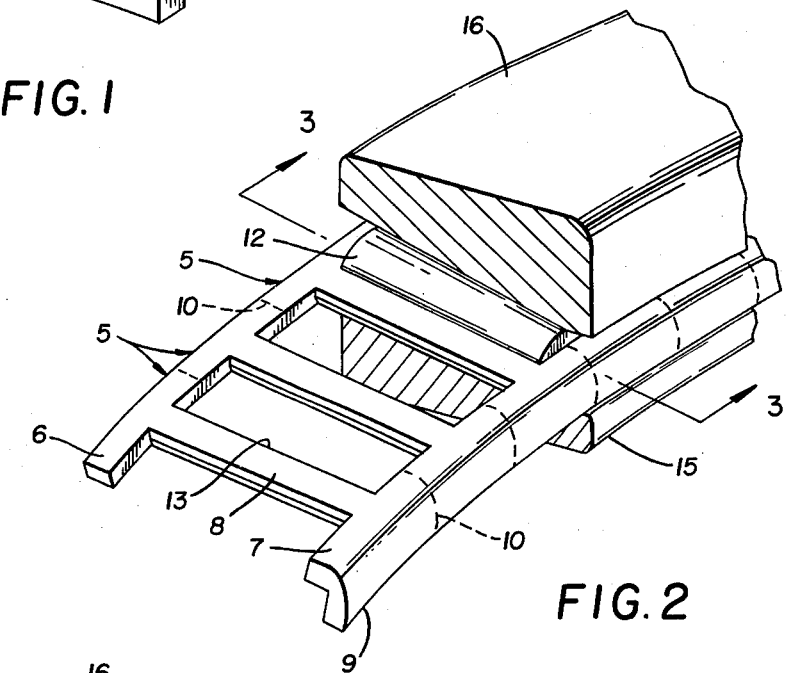
FIGURE 2 shows a portion of a completed bearing formed from such sections, with portions broken away to show the various parts of the bearing.
Figure 3:
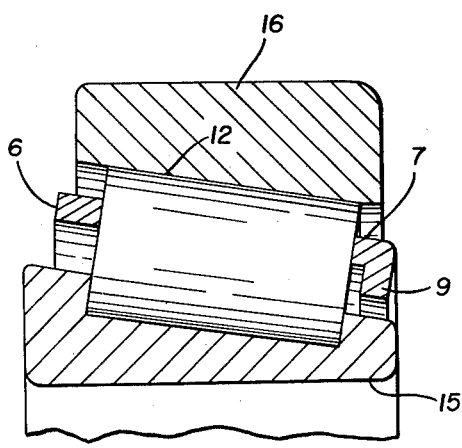
FIGURE 3 is a section on the line 3—3 of FIGURE 2.

Although the pockets in FIGURE 2 are designed for a tapered roller, it is to be understood that they may be of any shape, depending upon the shape of the roller.

It is to be noted that all of the sections in FIGURE 2 are identical. It is not necessary that they be symmetrical. The parts of the section form one complete opening.

After stamping, the sections are generally blasted to remove burrs, and the like. It may be necessary to individually machine brass sections. After uniting the sections, any excess metal may be removed, as is sometimes necessary.

Figure 4:
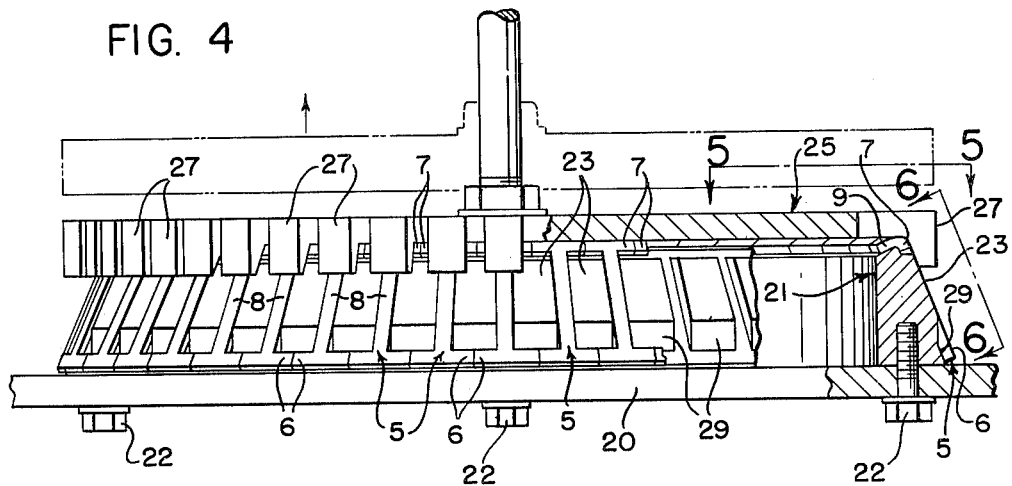
FIGURE 4 is an elevation of a fixture with assembled tapered-cage sections in it, partly broken away to better illustrate the invention.
Figure 6:
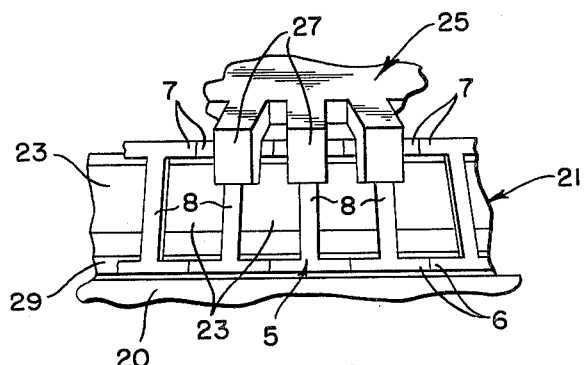
FIGURE 6 is an elevation of a part of the assembly of FIGURE 4, on the line 6—6.
Figure 5:
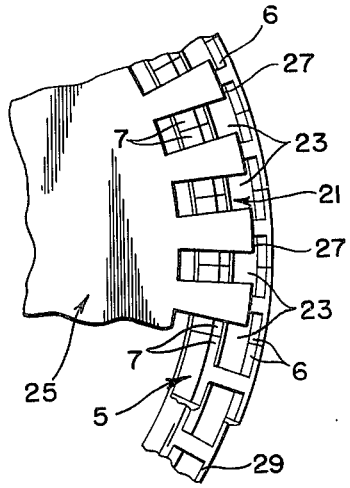
FIGURE 5 is a plan view of a part of the assembly of FIGURE 4, on the line 5—5.

The fixture of FIGURES 4 to 6 which is for a tapered cage, is formed of a base plate 20 to which the circular block 21 is fastened by bolts 22. The outer surface of this circular block 21 is generally the shape of a truncated cone with projections 23 over which the sections of the cage are fitted. After all of the sections have been put in place around the entire circumference of the block, they are clamped in place by tightening the clamping member 25 against them as clearly shown in FIGURE 4. The block 21 is formed at the top to fit under the flanges 9 of the various sections so that when the clamp 25 is lowered in place, the fingers 27 fit tight over the flange and clamp the various sections tightly against the block, leaving spaces between them for welding together the portions 7 of the inner rim. The portions 6 of the outer rim which are to be welded together are also exposed. The projections 23 space the sections 5 uniformly around the fixture and the spaces between the sections may measure from .000 to .060 inch, depending upon the type of welding to be employed. The edges of adjoining stampings may be stepped, and overlapped for welding. As shown, the fingers 27 fit down over the flanges 9 and lie flat against the webs 8 and the outer surfaces of the projections 23.

After welding, as at 28, the clamp is removed, and the completed cage is lifted vertically from the fixture. Some machining may be required to remove excess metal deposits formed when the sections are united. The bottom edges of the projections 23 are beveled at 29 to make this possible.

Figure 9:
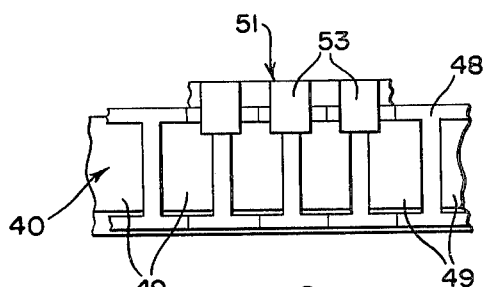
FIGURE 9 is an elevation of a part of the assembly of FIGURE 7, on the line 9—9.
Figure 7:
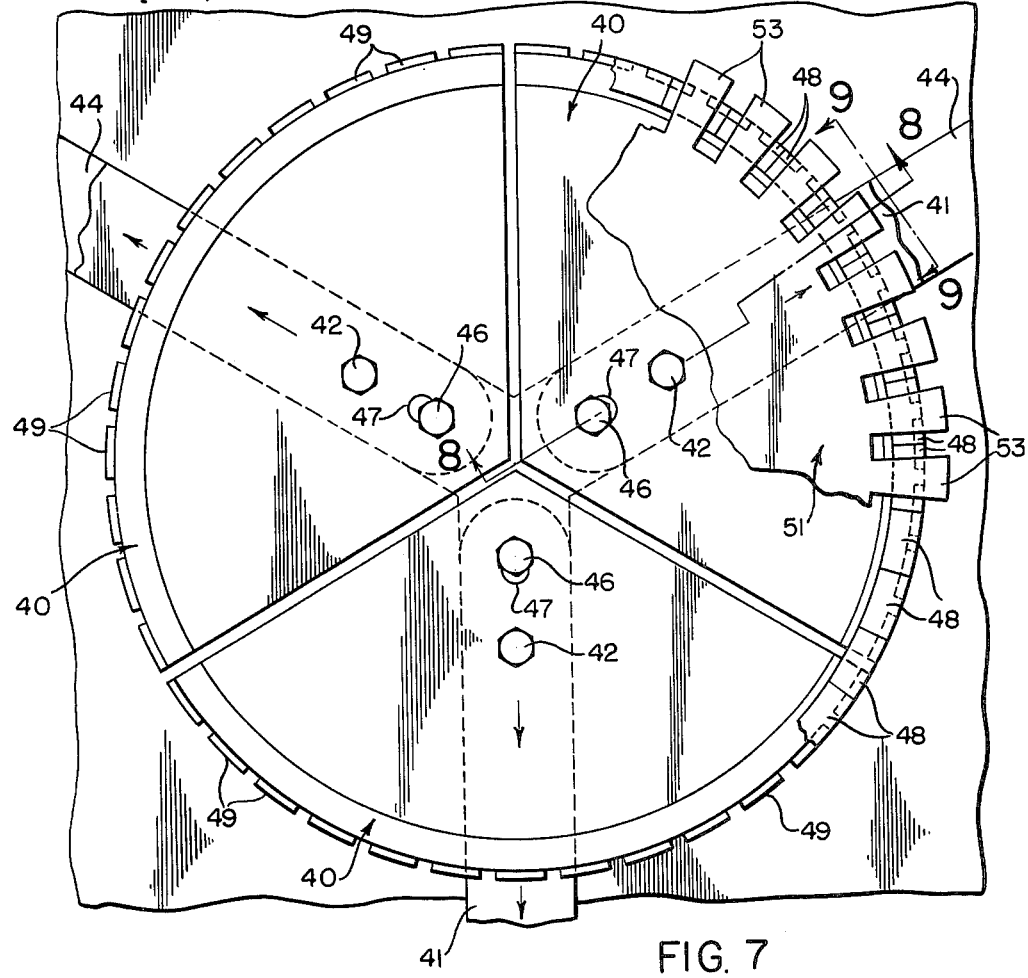
FIGURE 7 is a plan view of a fixture with assembled cylindrical-cage sections in it, partly broken away to better illustrate the invention.
Figure 8:
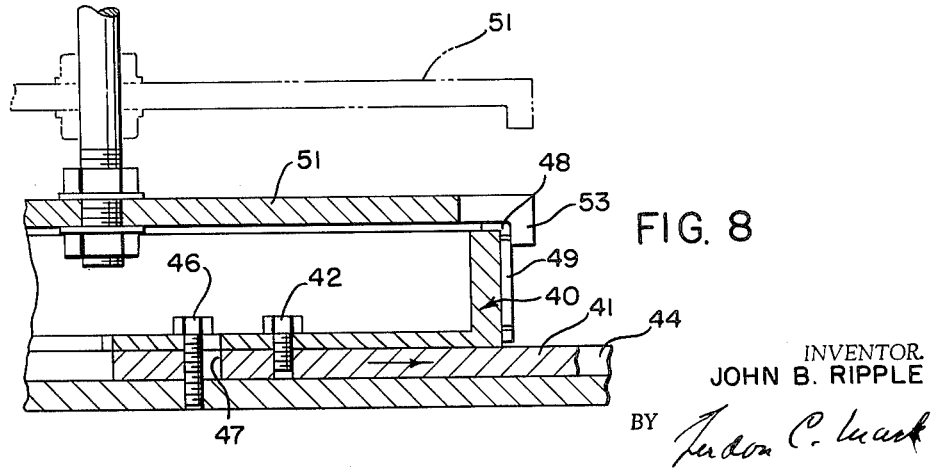
FIGURE 8 is a vertical section of the fixture with the clamp thereof shown in alternative positions, on the line 8—8 of FIGURE 7.

A cylindrical cage cannot be formed on such a fixture because the projections which space the sections interfere with separation of the cage from the fixture. FIGURES 7 to 9 illustrate one type of fixture which may be used. The circular block 40 is made in several sections, preferably three or more, which are slidably mounted so that they are movable to the center of the fixture to release the finished cage. Each of these block sections 40 is fastened to an arm 41 by a bolt 42. This arm is movable toward and away from the center of the block in a recess 44. The movement may be effected hydraulically or by other suitable means. The bolts 46 serve as stops, the slots 47 permitting limited radially inward movement of the sections 40 to release a completed cage, and limited outward movement to arrange the sections to form a circular mount for the cage sections 48. With the sections 40 thus extended, the cage sections 48 are placed over the projections 49, forming a complete circle with the sections spaced for welding. The clamping plate 51 is then lowered on to the tops of the cage sections and the fingers 53 of the clamp hold the various sections against the circular block, evenly spaced by the projections 49. The adjacent rim portions of these sections are welded together by any suitable means. The clamp 51 is then raised, the sections 40 are retracted by pushing the arms inwardly, as by means of pneumatic cylinders or the like, and the finished cage is then lifted from the fixture.

The invention is defined in the claims which follow.

What I claim is:

1. The method of assembling a roller-bearing cage from a plurality of rigid, pre-curved sections which equal in number the number of openings in the cage, each section comprising a web with portions of the inner and outer rims extending from the respective ends of the webs, which method comprises holding the sections in a ring with the ends of said respective portions of the inner and outer rims adjacent one another, and then welding the adjacent ends of said rim portions together.

2. The method of claim 1 in which the sections are spaced by using a fixture base on which there are projections adapted to fit into openings to be formed in the bearing which is formed, and the sections are clamped to said base between these projections and are thereby evenly spaced.

3. The method of claim 2 in which each section is cut from sheet steel of at least $\frac{1}{16}$ gauge and shaped by stamping.

References Cited by the Examiner

UNITED STATES PATENTS

| | | | |
|---|---|---|---|
| 2,366,120 | 12/1944 | Mansfield | 308—201 |
| 2,534,379 | 12/1950 | Schreiber | 308—217 |
| 2,591,160 | 4/1952 | Kilian | 29—148.4 X |
| 3,075,278 | 1/1963 | Bratt | 29—148.4 |

THOMAS H. EAGER, *Examiner.*

WHITMORE A. WILTZ, *Primary Examiner.*